Patented Jan. 27, 1953

2,626,908

UNITED STATES PATENT OFFICE 2,626,908

PROCESS FOR BREAKING PETROLEUM EMULSIONS

Melvin De Groote, University City, Mo., assignor to Petrolite Corporation, a corporation of Delaware No Drawing. Application May 14, 1951,
Serial No. 226,316

11 Claims. (Cl. 252—340)

The present invention is a continuation-in-part of my co-pending applications, Serial Nos. 127,773 (now Patent 2,552,533, granted May 15, 1951) and 127,774 (now abandoned), both filed November 16, 1949. Said aforementioned co-pending applications represent in turn a continuation-in-part of my co-pending applications, Serial Nos. 104,801 (now Patent 2,552,528, granted May 15, 1951) and 104,802 (now abandoned), both filed July 14, 1949. See also my co-pending applications, Serial Nos. 104,805 (now Patent 2,554,667, granted May 29, 1951) and 104,806 (now abandoned), both filed July 14, 1949.

The present invention is concerned with a process for breaking petroleum emulsions of the water-in-oil type characterized by subjecting the emulsion to the action of a demulsifier including fractional esters; said fractional esters being those of (A) a polycarboxy acid with (B) high molal oxypropylated oxyalkylated polypentaerythritols, which oxyalkylated polypentaerythritols are characterized by freedom from radicals having at least 8 uninterrupted carbon atoms, a molecular weight between 1200 and 25,000, being obtained by oxyalkylating a polypentaerythritol with either ethylene oxide or glycide or both, with the result that it is water dispersible and xylene-insoluble, the oxypropylation being carried to an extent such that the oxypropylated oxyalkylated polypentaerythritol has a molecular weight between 5000 to 100,000, that this product be at least dispersible in xylene, that the polypentaerythritol represent not more than 7% by weight of the oxypropylated oxyalkylated polypentaerythritol, and with the further proviso that in forming the ester, one mole of the polycarboxy acid be used for each available hydroxyl radical of the polyol. Molecular weights stated above are based on the assumption of complete reaction involving the alkylene oxides and the polypentaerythritol and are on an average statistical basis.

Complementary to the aspect of the invention herein disclosed is my companion invention concerned with the new chemical products or compounds used as the demulsifying agents in the processes or procedures of this invention, as well as the application of such chemical compounds, products, or the like, in various other arts and industries, along with the method for manufacturing said new chemical products or compounds which are of outstanding value in demulsification. See my co-pending application, Serial No. 226,317, filed May 14, 1951.

For convenience, what is said hereinafter will be divided into six parts:

Part 1 is concerned with the description of the polyhydric reactants employed, as well as reference to other compounds, products, etc., so there may be a clear line of demarcation between the present invention and what may appear elsewhere;

Part 2 is concerned with the preparation of intermediate reactants by use of ethylene oxide or glycide, or both;

Part 3 is concerned with the preparation of the oxypropylated derivatives from the intermediates;

Part 4 is concerned with the preparation of the acidic esters by reacting the polyhydroxylated compound with polycarboxy acid;

Part 5 is concerned with the use of the acidic fractional esters as demulsifiers for resolving petroleum emulsions of the water-in-oil type, and Part 6 is concerned with derivatives valuable for various purposes, including demulsification but not specifically claimed in the instant application.

PART 1

Generally speaking, organic compounds having approximately the same number of oxygen atoms as carbon atoms are apt to be, and almost invariably are, water-soluble, and the most common could be illustrated by ethyl alcohol, methyl alcohol, acetic acid, acetone, formaldehyde, etc. When compounds reach enormously high molecular weights compared with such simple compounds, for instance, in the category of 30,000 to 50,000, or upward and preferably upward, such as approximate ratio of carbon to oxygen does not necessarily guarantee water-solubility as, for example, in the case of cellulose or possibly some starches. There are other classes of comparatively low molecular weight compounds, for instance, polypentaerythritols, varying from tri-pentaerythritol to deca-pentaerythritol, where the molecular weight varies roughly from 372 to 1200, which are not water-soluble in the ordinary sense. Pentaerythritol is fairly water-soluble, approximately 4% or 5% in water at ordinary temperature. Di-pentaerythritol is soluble to the extent of but two-tenths of one per cent.

The present invention, as has been pointed out previously, is concerned with acidic fractional esters which, in turn, are obtained from the oxypropylation products derived from dipentaerythritol and higher polypentaerythritols. Such oxypropylation is conducted to the stage where the end products are xylene-soluble and have a molecular weight within the range of 5,000 to 65,000. Such polyhydric compounds after oxypropylation are subjected to reaction with polycarboxy acids so as to yield acid esters. The acid esters so obtained are valuable for numerous purposes and particularly for resolution of water-in-oil emulsions. The oxypropylation derivatives prior to esterification may be considered conveniently as intermediates.

The acidic fractional esters owe their valuable properties, at least in part, to the inherent properties of the parent hydroxy compound or the derivatives which have been previously referred to as intermediates. These intermediate compounds herein described owe their peculiar properties to a number of factors immediately enumerated, at least in part:

(a) Size of molecule
(b) Shape of molecule as far as space configuration goes
(c) Absence of a single hydrophobe group having as many as 8 uninterrupted carbon atoms in a single radical
(d) Substantial insolubility in water in certain instances
(e) Solubility in xylene
(f) The fact that the initial reactant requires the presence of at least 6 hydroxyl radicals
(g) Such combination being obtained by reaction involving propylene oxide.

My preferred initial reactants are the polypentaerythritols as herein described. For purpose of convenience the word "polypentaerythritol" will mean those higher derivatives beginning with di-pentaerythritol, up to and including the deca-pentaerythritols, or other comparable members of the class. In this connection in regard to the preparation of polypentaerythritols attention is directed to U. S. Patent No. 2,462,049, dated February 15, 1949, to Wyler. For instance, this patent mentions, among other things, the following:

|  | Molecular weight |
|---|---|
| Tri-pentaerythritol | 372.41 |
| Tetra-pentaerythritol | 490.54 |
| Penta-pentaerythritol | 608.67 |
| Hexa-pentaerythritol | 726.80 |
| Hepta-pentaerythritol | 844.93 |
| Octa-pentaerythritol | 963.06 |
| Nona-pentaerythritol | 1,081.19 |
| Deca-pentaerythritol | 1,199.32 |

Other procedures have been described for preparing polypentaerythritol, using some other catalyst as described in British Patent No. 615,370, to Marrian and McLean (Imperial Chemical Industries, Ltd.).

The same catalyst as used in the above two mentioned issued patents illustrates a class of catalyst employed also to produce etherization in numerous other polyhydric compounds as, for example, in the case of polyglycerols, sorbitol, etc., etc. It is obvious that modified polypentaerythritols can be obtained by inter-mixing with another polyhydric alcohol, even though not water-insoluble, followed by etherization, to produce the higher molecular weight product. For instance, two moles of tripentaerythritol could be polymerized with one mole of glycol or diglycerol to give a modified hexa-pentaerythritol which, in essence, might be somewhat analogous to a hexa-pentaerythritol treated with glycide, although not necessarily so. Similarly, other polyhydric alcohols, such as sorbitol, sorbitan, mannitan, mannitol, and tetramethylolhexanol, can be employed, provided, however, that the resultant used as an initial reactant is water-insoluble, and xylene-insoluble, has at least 6 hydroxyls and a molecular weight not in excess of 1200. Such materials can be varied in an inconsequential or insignificant sort of way without detracting from the structure of the final oxypropylated derivative; for instance, a number of the hydroxyl groups might be converted into an acetal or a ketal in the conventional manner; or one might produce an ester of a low molal acid, such as acetic acid, glycollic acid, lactic acid, propionic acid, etc. Tripentaerythritol could be treated with a mole of ethylene oxide or several moles of ethylene oxide, or a mole of glycide, or a mole of butylene oxide, or methyl glycide, and then subjected to polymerization so as to give materials which, obviously, are the chemical and also physical-chemical equivalent of the herein specified, preferred and commercially available reactants, i. e., the polypentaerythritols.

My preferred reactants are tripentaerythritol, which is sold commercially, and a higher polypentaerythritol (average hydroxyl content 32.3). My third preferred reactant is the tetra-pentaerythritol manufactured in the manner described in Example 2 of aforementioned British Patent No. 615,370.

In a preceding paragraph reference has been made to substantial insolubility in water in certain cases. In examing the data in Part Two of the text it will be noted that the derivatives are limited to those which show xylene-solubility and that in the higher stages of oxypropylation the derivatives show water-insolubility or substantial water-insolubility. This is illustrated by examples and, as a matter of fact, in many instances the water-insoluble derivatives are particularly to be preferred for use as demulsifiers.

PART 2

Part 2 is concerned with the production of water-soluble derivatives from dipentaerythritol or tripentaerythritol or higher polypentaerythritols by reaction with ethylene oxide or glycide, or both. Part 3 is concerned with oxypropylation. Since the equipment used for oxyethylation and oxypropylation is essentially the same insofar that an autoclave with suitable arrangements for introduction of the reactant is employed this equipment will be described in the instant part of the specification and, thus, repetition avoided in Part 3.

Similarly, although pressure is not required in the introduction of glycide the same piece of equipment can be employed, using an open condenser as will be pointed out in the text.

I have prepared derivatives of the kind described in Part 1, preceding, on a scale varying from a few hundred grams or less in the laboratory, to hundreds of pounds on a plant scale. The same applies in the preparation of the oxyalkylated compounds with which the third part of the text is concerned. In preparing a large number of examples I have found it particularly advantageous to use laboratory equipment which permits continuous oxypropylation and oxyethylation. More specific reference will be made to treatment with glycide subsequently in the text. The oxypropylation step is, of course, the same as the oxyethylation step insofar that two low boiling liquids are handled in each instance. What immediately follows refers to oxyethylation and it is understood that oxypropylation can be handled conveniently in exactly the same manner.

The oxyethylation procedure employed in the preparation of derivatives of the preceding intermediates has been uniformly the same, particularly in light of the fact that a continuous operating procedure was employed. In this particular procedure the autoclave was a conventional autoclave, made of stainless steel and having a capacity of approximately one gallon, and a working pressure of 1,000 pounds gauge pressure. The autoclave was equipped with the conventional devices and openings, such as the variable stirrer operating at speeds from 50 R. P. M. to 500 R. P. M., thermometer well and thermocouple for mechanical thermometer; emptying outlet; pressure gauge, manual vent line; charge hole for initial reactants; at least one connection for conducting the incoming alkylene oxide, such as ethylene oxide, to the bottom of the autoclave; along with suitable devices for both cooling and heating the autoclave, such as a cooling jacket and, preferably coils in addition thereto, with the jacket so arranged that it is suitable for heating with steam or cooling with water, and further equipped with electrical heating devices. Such autoclaves are, of course, in essence small scale replicas of the usual conventional autoclave used in oxyalkylation procedures.

Continuous operation, or substantially continuous operation, is achieved by the use of a separate container to hold the alkylene oxide being employed, particularly ethylene oxide. The container consists essentially of a laboratory bomb having a capacity of about one-half gallon, or somewhat in excess thereof. This bomb was equipped, also, with an inlet for charging, and an outlet tube going to the bottom of the container so as to permit discharging of alkylene oxide in the liquid phase to the autoclave. Other convenient equipment consists, of course, of the rupture disc, pressure gauge, sight feed glass, thermometer, connection for nitrogen for pressuring bomb, etc. The bomb was placed on a scale during use and the connections between the bomb and the autoclave were flexible stainless steel hose or tubing so that continuous weighings could be made without breaking or making any connections. This also applied to the nitrogen line, which was used to pressure the bomb reservoir. To the extent that it was required, any other usual conventional procedure or addition which provided greater safety was used, of course, such as safety glass protective screens, etc.

With this particular arrangement practically all oxyethylations become uniform in that the reaction temperature could be held within a few degrees of any selected point in this particular range.

In the early stages where the concentration of catalyst is high the temperature was generally set for around 150° C. or thereabouts. Subsequently, temperatures up to 170° C. or higher may be required. It will be noted by examination of subsequent examples that this temperature range was satisfactory. In any case, where the reaction goes more slowly a higher temperature may be used, for instance 165° C. to 180° C., and if need be 185° C. to 190° C. Incidentally, oxypropylation takes place more slowly than oxyethylation as a rule and for this reason we have used a temperature of approximately 160° C. to 165° C., as being particularly desirable for initial oxypropylation, and have stayed within the range of 165° C. to 185° C., almost invariably during oxypropylation. The ethylene oxide was forced in by means of nitrogen pressure as rapidly as it was absorbed as indicated by the pressure gauge in the autoclave. In case the reaction slowed up the temperature was raised so as to speed up the reaction somewhat by use of extreme heat. If need be, cooling water was employed to control the temperature.

As previously pointed out in the case of oxypropylation as differentiated from oxyethylation, there was a tendency for the reaction to slow up as the temperature dropped much below the selected point of reaction, for instance, 170° C. In this instance the technique employed was the same as before, that is, either cooling water was cut down or steam was employed, or the addition of propylene oxide speeded up, or electric heat used in addition to the steam in order that the reaction proceeded at, or near, the selected temperatures to be maintained.

Inversely, if the reaction proceeded too fast regardless of the particular alkylene oxide, the amount of reactant being added, such as ethylene oxide, was cut down or electrical heat was cut off, or steam was reduced, or if need be cooling water was run through both the jacket and the cooling coil. All these operations, of course, are dependent on the required number of conventional gauges, check valves, etc., and the entire equipment, as has been pointed out, is conventional and, as far as we are aware, can be furnished by at least two firms who specialize in the manufacture of this kind of equipment.

Attention is directed to the fact that the use of glycide requires extreme caution. This is particularly true on any scale other than small laboratory scale or semi-pilot plant operations. Purely from the standpoint of safty in the handling of glycide, attention is directed to the following: (a) If prepared from glycerol monochlorohydrin, this product should be comparatively pure; (b) the glycide itself should be as pure as possible as the effect of impurities is difficult to evaluate; (c) the glycide should be introduced carefully and precaution should be taken that it reacts as promptly as introduced, i. e., that no excess of glycide is allowed to accumulate; (d) all necessary precaution should be taken that glycide cannot polymerize per se; (e) due to the high boiling point of glycide one can readily employ a typical separatable glass resin pot as described in U. S. Patent No. 2,499,365, dated March 7, 1950, to De Groote and Keiser, and offered for sale by numerous laboratory supply houses. If such arrangement is used to prepare laboratory scale duplications, then care should be taken that the heating mantle can be removed rapidly so as to allow for cooling; or better still, through an added opening at the top, the glass resin pot or comparable vessel should be equipped with a stainless steel cooling coil so that the pot can be cooled more rapidly than mere removal of mantle. If a stainless steel coil is introduced it means that conventional stirrer of the paddle type is changed into the centrifugal type which causes the fluid or reactants to mix due to swirling motion in the center of the pot. Still better is the use of a laboratory autoclave of the kind previously described in this Part; but in any event, when the initial amount of glycide is added to a suitable reactant, the speed of reaction should be controlled by the usual factors, such as (a) the addition of glycide; (b) the elimination of external heat, and (c) use of cooling coil so there is no undue rise in temperature. All the foregoing is merely conventional but is included due to the hazard in handling glycide.

*Example 1a*

The reaction vessel employed was a stainless steel autoclave with the usual devices for heating, heat control, stirrer, inlet, outlet, etc., which are conventional in this type of apparatus. The capacity was approximately 3½ liters. The stirrer operated at a speed of approximately 300–350 R. P. M. There were charged into the autoclave 373 grams of tripentaerythritol along with 365 grams of solvent. In this instance xylene was used. Any nonvolatile inert solvent, such as xylene, decalin, diethylether of ethylene glycol, or a higher boiling aromatic solvent, such as mesitylene, can be used. Approximately 10 grams of catalyst were added. Sodium methylate was used, although ground caustic soda or ground caustic potash, or any one of a number of other alkaline catalysts are equally suitable. The autoclave was sealed, swept with nitrogen gas, and stirring started immediately and heat applied, and the temperature allowed to rise to approximately 150° C. At this point addition of ethylene oxide was started. It was added continuously at such speed that it was absorbed by the reaction as rapidly as added.

The oxide was run in so that the rate of absorption was approximately 20 grams per minute. The temperature range was controlled within 150° to 200° C. and the pressure did not go in excess of 100 pounds at any time except, perhaps, momentarily reaching 110 to 130 pounds. The total amount of ethylene oxide added was 1100 grams. This experiment was included in the table which follows. In some instances the ethylene oxide was added batchwise, hence the pressure developed at times to 200 or 300 pounds gauge pressure.

The same procedure was followed in other experiments except that two larger autoclaves were used in the subsequent experiments, to wit, a 10-liter autoclave and also a 5-gallon autoclave. The working arrangement on this larger autoclave was the same as in the small one but the rate of ethylene oxide addition could be speeded up distinctly, for instance, when using a 10-liter autoclave, ethylene oxide was introduced at the rate of 30 to 40 grams per minute, and in the larger autoclave at the rate of approximately 1 to 2 pounds, or about 450 to 1,000 grams, per minute. Since the larger autoclaves were more heavily built there was, of course, less danger of any undue hazard and, also apparently although the speed of stirring may be roughly the same as in the other autoclaves possibly the stirrer design gives more effective mixture. These are obvious variations which take place in any conventional autoclave with a stirrer. It would be immaterial, of course, if the ethylene oxide had been added more slowly except that a greater period of time would have been involved.

*Example 4a*

Note that experiments 2a and 3a are omitted for the reason that they appear in the table and this example is included because it is the first one of the series shown in the table obtained by using glycide only.

The same piece of equipment was used as previously described, i. e., an autoclave, although in the instant experiment involving the use of glycide there was no pressure involved and certain changes were made as noted subsequently. The autoclave was equipped with a water-cooled condenser which was shut off when used as an autoclave. It was also equipped with a separatory funnel and an equalizing pressure tube so that liquid, such as glycide, could be fed continuously at a dropwise or a faster rate into the vessel and the rate was controlled by visual examination. For convenience, this piece of equipment is referred to as an autoclave because it was designed essentially for such use but it is to be noted it was not so used when glycide was employed as the alkylene oxide.

There were charged into the autoclave the same reactants (intermediate, solvent, and sodium methylate) as Example 1a. The autoclave was sealed, swept with nitrogen gas and stirring started immediately and heat applied. The temperature was allowed to rise to 120° C. The glycide employed was comparatively pure. 1850 grams of glycide were used. This charged into the upper reservoir vessel which had been previously flushed out with nitrogen and was the equivalent of a separatory funnel. The glycide was started slowly into the reaction mass in a dropwise stream. The reaction started to take place immediately and the temperature rose approximately 10° to 15°. Cooling water was run through the coils so that the temperature for addition of glycide was controlled within the range roughly of 110° C. to 130° C. The addition was continuous within the limitations and all the glycide was added in less than 2 hours. This reaction took place at atmospheric pressure with simply a small stream of nitrogen passing into the autoclave at the very top and passing out through the open condenser so as to avoid any possible entrance of air.

It is believed that one could add a mixture of ethylene oxide and glycide under the same conditions as ethylene oxide is added, i. e., using the equipment as an autoclave. However, since the glycide is generally more reactive than the ethylene oxide there does not appear to be any advantage in such particular procedure and in instances where both ethylene oxide and glycide were employed the procedure has been conducted both ways, i. e., adding the glycide first and then the ethylene oxide, or the other way around, that is, adding the ethylene oxide first and then the glycide. Needless to say, the oxyalkyl chain introduced into the polypentaerythritol molecule must necessarily vary depending on whether the glycide was added first or the ethylene oxide. In any event, the final product must be obviously water-soluble in a manner entirely differentiated from the initial reactant. In the table the molecular weight, of course, is an average molecular weight based on the assumption that the reaction goes to completion between the initial raw material and the oxyalkylating agent.

An attempt was made to obtain a pure decapentaerythritol by reaction between two moles of penta-pentaerythritol. The exact composition of this derivative is not known but soluble products were derived which apparently had a molecular weight, on the basis aforementioned, of approximately 20,000. Needless to say, one need not stop with initial water-solubility but there could be some enhanced water-solubility over the minimum point by merely further oxyalkylating with ethylene oxide or glycide, or both. For this reason in the specification the molecular weight of the intermediate has been set within a range of over 1200 to 25,000.

In regard to the speed of reaction, temperature of reaction and reaction pressures (in the case of ethylene oxide or propylene oxide) attention is directed to the fact that the amount of catalyst used is rather significant. It is usually practical to start a reaction with one, two or three per cent of an akaline catalyst, such as sodium methylate, based on the amount of reactant. Subsequently if the reaction slows down or takes too high a temperature, or pressures appear to be unduly high, it probably indicates that more catalyst should be added. In numerous instances 2% of catalyst is started at the beginning of the reaction and at the final stage probably not more than ¼% or ⅓% is present, which is usually enough but, as has been pointed out, more can be added at an intermediate stage.

the reflux condenser or some other suitable trap arrangement so the xylene employed as a solvent can be readily removed. For convenience, in the subsequent experiments the xylene was removed although this is unnecessary for reasons

TABLE A

| Ex. No. | Polypentaerythritol | Empirical Formula | Molecular Wt. | No. of Hydroxyls | Gms. Used in Example | Solvent (Xylene), Gms. | Catalyst (Sod. Meth.), Gms. | EtO Added, (Gms.) | Molar Ratio, EtO to Hydroxyl | Glycide Added, Gms. | Molar Ratio, Glycide to Hydroxyl | Molar Ratio, Total Alkylene Oxide to Hydroxyl | Molar Wt., Final Stage of Intermediate |
|---|---|---|---|---|---|---|---|---|---|---|---|---|---|
| 1a | Tri- | $C_{15}H_{32}O_{10}$ | 372.4 | 8 | 373 | 375 | 5 | 1,100 | 3:1 | 0 | 0 | 3:1 | 1,470 |
| 2a | Tri- | $C_{15}H_{32}O_{10}$ | 372.4 | 8 | 373 | 375 | 5 | 720 | 2:1 | 590 | 1:1 | 3:1 | 1,680 |
| 3a | Tri- | $C_{15}H_{32}O_{10}$ | 372.4 | 8 | 373 | 375 | 6 | 360 | 1:1 | 1,180 | 2:1 | 3:1 | 1,910 |
| 4a | Tri- | $C_{15}H_{32}O_{10}$ | 372.4 | 8 | 373 | 375 | 5 | 0 | 0 | 1,850 | 3:1 | 3:1 | 2,720 |
| 5a | Tetra- | $C_{20}H_{42}O_{13}$ | 490.5 | 10 | 490 | 500 | 8 | 2,000 | 4.5:1 | 0 | 0 | 4.5:1 | 2,490 |
| 6a | Tetra- | $C_{20}H_{42}O_{13}$ | 490.5 | 10 | 490 | 500 | 10 | 1,325 | 3:1 | 1,480 | 2:1 | 5:1 | 3,295 |
| 7a | Tetra- | $C_{20}H_{42}O_{13}$ | 490.5 | 10 | 490 | 500 | 10 | 880 | 2:1 | 2,225 | 3:1 | 5:1 | 3,595 |
| 8a | Tetra- | $C_{20}H_{42}O_{13}$ | 490.5 | 10 | 490 | 500 | 16 | 0 | 0 | 3,000 | 4:1 | 5:1 | 3,490 |
| 9a | Hepta- | $C_{35}H_{72}O_{22}$ | 845 | 16 | 845 | 850 | 20 | 6,340 | 9:1 | 0 | 0 | 9:1 | 7,185 |
| 10a | Hepta- | $C_{35}H_{72}O_{22}$ | 845 | 16 | 845 | 850 | 20 | 5,640 | 8:1 | 1,185 | 1:1 | 9:1 | 7,670 |
| 11a | Hepta- | $C_{35}H_{72}O_{22}$ | 845 | 16 | 845 | 850 | 20 | 4,500 | 7:1 | 2,375 | 2:1 | 9:1 | 7,720 |
| 12a | Hepta- | $C_{35}H_{72}O_{22}$ | 845 | 16 | 845 | 850 | 20 | 4,360 | 6:1 | 3,650 | 3:1 | 9:1 | 8,855 |
| 13a | Hepta- | $C_{35}H_{72}O_{22}$ | 845 | 16 | 845 | 850 | 20 | 2,820 | 4:1 | 5,335 | 4.5:1 | 8.5:1 | 9,000 |
| 14a | Hepta- | $C_{35}H_{72}O_{22}$ | 845 | 16 | 845 | 850 | 25 | 2,115 | 3:1 | 6,525 | 5.5:1 | 8.5:1 | 9,485 |
| 15a | Hepta- | $C_{35}H_{72}O_{22}$ | 845 | 16 | 845 | 850 | 25 | 0 | 0 | 9,500 | 8:1 | 8:1 | 10,345 |

The intermediate products obtained in the manner above described are invariably xylene-insoluble but show a distinct tendency to disperse or become soluble in water. At times the solubility in water approximates that of an ordinary soap or starch solution; although this characterization is just approximate there is absolutely no confusion with the insolubility of the original polypentaerythritol used as the raw material. Even if ground to a fine mesh, for instance, 200 mesh or finer, and shaken in water they simply represent coarse suspensions and nothing more. The product obtained as an intermediate contains solvent which can be readily removed by vacuum distillation. If the solvent happens to be xylene as in the previous examples a temperature of 180° to 200° C. is perfectly satisfactory. During this initial stage the products seem to darken and the intermediate is usually a viscous, somewhat sirupy product of an amber, dark brown, or reddish brown color. The color may be due to a trace of iron because of contamination from the vessel employed. However, even when stainless steel is employed of such character that contamination by iron seems out of the question, there is still discoloration, probably due to the inherent nature of the initial raw material or a subsequent carmelization-like reaction.

Intermediates can be decolorized in the usual manner by treating with charcoal, filtering clay, or the like. If such procedure is employed it is generally more desirable to use it after the final stage, i. e., after the oxypropylation has been completed. No such refinement was employed in connection with the above samples.

PART 3

This section is concerned with the oxypropylation of the intermediates obtained as described in Part 2 immediately preceding. The equipment, reaction conditions, etc., have been specified already.

In the series of examples noted in the subsequent table it has been found expedient to use more than one size autoclave, that is, a size of about 3½ liters, a 2½ gallon size, and a 5-gallon size.

Previous reference has been made to the arrangement used when oxyalkylation is conducted with glycide by simply changing the position of above indicated unless required by ultimate use of the final product. In experiments noted in the table approximately one-tenth of a gram molecular weight was taken as the initial starting weight, i. e., the intermediate described in Part 2, preceding. The amount of propylene oxide added in each instance was approximately 10 moles, or 575–585 grams. Since this was added to one-tenth of a gram molecular weight equivalent the ratio is the same as if 100 moles of propylene oxide were added per gram molecular weight of the intermediate.

For convenience, in Table B there is also noted the molal ratio of propylene oxide to other alkylene oxide based on the hydroxyl number of the initial reactant, i. e., the polypentaerythritol initially employed. It will be noted that the table shows molecular weight variations ranging from 7,000 to approximately 54,000. All the products were xylene-soluble.

Oxypropylation of the intermediate sometimes yields products which show considerably decreased water solubility and sometimes even seem to approach water insolubility, but no attempt has been made to define this particular solubility as being markedly different than the water solubility of the intermediate. There is, of course, an enormous difference between the water-solubility of the initial raw material, i. e., the polypentaerythritol which, in fact, is not water-soluble at all.

The amount of catalyst employed is noted in grams. Generally speaking, approximately 2½% to 3% by weight of sodium methylate was added to the initial charge, i. e., the intermediate obtained as described in Part 2. Whenever the amount of catalyst fell below one-half of one per cent, more was added.

It will be noted that the amount of catalyst actually present is higher than indicated by the figures for the reason that there is residual catalyst left over from the intermediate step in Part 2.

The temperatures, pressure, and time of reaction have been indicated previously in Part 2 for the reason that the same equipment is used in oxypropylation as in oxyethylation. In the use of the small autoclave approximately 20 grams of propylene oxide were added per minute; in the use of the larger autoclave (2½ gallon size) the rate was increased to approximately 30 to 35 grams per minute; in the largest autoclave (5 gallons) about 300 to 700 grams of propylene oxide were added per minute.

As has been pointed out previously, the rate of reaction, the pressures, and temperatures, all are related to the time required for reaction and under the conditions previously indicated the amount of catalyst used above is more than ample for perfectly satisfactory working conditions, for example, temperatures, pressures, etc., as indicated in Part 2 in connection with oxyalkylation as herein described.

There is, however, a factor which enters into oxypropylation in this series of experiments tistical average and completeness of reaction are not justified in light of cost. For reasons of exploration some have been made in the 100,000 molecular weight range but the slowness of reaction places this type at a disadvantage in light of the increased cost of manufacture. If glycide is used in the intermediate stage additional hydroxyl radicals are formed and, presumably, the secondary hydroxyls are as reactive as the primary hydroxyls. This effect tends to offset the reduction in reaction speed due to molecule size. However, glycide is more expensive than ethylene oxide and for this reason such manipulative procedure is more costly.

TABLE B

| Ex. No. | Ex. No. Reactant | Amt. Taken, Gms. (Solvent-Free) | Molecular Wt. of Reactant | Gms. Molecular Wt. Equiv-Used | Propylene Oxide, Gms. | Propylene Oxide in Moles | Molar Ratio, Propylene Oxide to other Alkylene Oxide Based on Original Hydroxyl Group | Catalyst (Sodium Methylate), Gms. | Molar Wt. of Reaction Product | Xylene Soluble |
|---|---|---|---|---|---|---|---|---|---|---|
| 1b | 1a | 147 | 1,470 | .1 | 575–585 | 10 | 4.2 | 5 | 7,270 | Yes. |
| 2b | 1b | 725 | 7,270 | .1 | 575–585 | 10 | 8.3 | -------- | 13,070 | Yes. |
| 3b | 2b | 1,305 | 13,070 | .1 | 575–585 | 10 | 12.5 | -------- | 18,870 | Yes. |
| 4b | 3b | 1,885 | 18,870 | .1 | 575–585 | 10 | 16.7 | 5 | 24,670 | Yes. |
| 5b | 4b | 2,465 | 24,670 | .1 | 575–585 | 10 | 20.8 | -------- | 30,470 | Yes. |
| 6b | 5a | 249 | 2,490 | .1 | 575–585 | 10 | 2.2 | 8 | 8,290 | Yes. |
| 7b | 6b | 830 | 8,290 | .1 | 575–585 | 10 | 4.4 | -------- | 14,090 | Yes. |
| 8b | 7b | 1,410 | 14,090 | .1 | 575–585 | 10 | 6.7 | -------- | 19,890 | Yes. |
| 9b | 8b | 1,990 | 19,890 | .1 | 575–585 | 10 | 8.9 | 7 | 25,690 | Yes. |
| 10b | 9b | 2,570 | 25,690 | .1 | 575–585 | 10 | 11.1 | -------- | 31,490 | Yes. |
| 11b | 10b | 3,150 | 31,490 | .1 | 575–585 | 10 | 13.3 | 5 | 37,290 | Yes.[1] |
| 12b | 9a | 718.5 | 7,185 | .1 | 575–585 | 10 | .7 | 17 | 12,985 | Yes. |
| 13b | 12b | 1,300 | 12,985 | .1 | 575–585 | 10 | 1.39 | -------- | 18,785 | Yes. |
| 14b | 13b | 1,880 | 18,785 | .1 | 575–585 | 10 | 2.07 | -------- | 24,585 | Yes. |
| 15b | 14b | 2,460 | 24,585 | .1 | 575–585 | 10 | 2.78 | 10 | 30,385 | Yes. |
| 16b | 15b | 3,040 | 30,385 | .1 | 575–585 | 10 | 3.47 | -------- | 36,185 | Yes.[1] |
| 17b | 16b | 3,620 | 36,185 | .1 | 575–585 | 10 | 4.19 | -------- | 41,985 | Yes.[1] |
| 18b | 17b | 4,200 | 41,985 | .1 | 575–585 | 10 | 4.85 | 7 | 47,785 | Yes.[1] |
| 19b | 18b | 4,780 | 47,785 | .1 | 575–585 | 10 | 5.56 | -------- | 53,585 | Yes.[1] |
| 20b | 10a | 767.0 | 7,670 | .1 | 575–585 | 10 | .7 | 18 | 13,470 | Yes. |
| 21b | 20b | 1,350 | 13,470 | .1 | 575–585 | 10 | 1.39 | -------- | 19,270 | Yes. |
| 22b | 21b | 1,925 | 19,270 | .1 | 575–585 | 10 | 2.07 | -------- | 25,070 | Yes. |
| 23b | 22b | 2,505 | 25,070 | .1 | 575–585 | 10 | 2.78 | 10 | 30,870 | Yes. |
| 24b | 23b | 3,090 | 30,870 | .1 | 575–585 | 10 | 3.47 | -------- | 36,670 | Yes.[1] |
| 25b | 24b | 3,670 | 36,670 | .1 | 575–585 | 10 | 4.19 | -------- | 42,470 | Yes.[1] |
| 26b | 25b | 4,250 | 42,470 | .1 | 575–585 | 10 | 4.85 | 10 | 48,270 | Yes.[1] |
| 27b | 11a | 772 | 7,720 | .1 | 575–585 | 10 | .7 | 20 | 13,520 | Yes. |
| 28b | 27b | 1,350 | 13,520 | .1 | 575–585 | 10 | 1.39 | -------- | 19,320 | Yes. |
| 29b | 28b | 1,930 | 19,320 | .1 | 575–585 | 10 | 2.07 | -------- | 25,120 | Yes. |
| 30b | 29b | 2,510 | 25,120 | .1 | 575–585 | 10 | 2.78 | -------- | 30,920 | Yes. |
| 31b | 30b | 3,090 | 30,920 | .1 | 575–585 | 10 | 3.47 | 5 | 36,720 | Yes.[1] |
| 32b | 31b | 3,670 | 36,720 | .1 | 575–585 | 10 | 4.19 | -------- | 42,520 | Yes.[1] |
| 33b | 32b | 4,250 | 42,520 | .1 | 575–585 | 10 | 4.85 | 5 | 48,320 | Yes.[1] |
| 34b | 33b | 4,830 | 48,320 | .1 | 575–585 | 10 | 5.56 | -------- | 54,120 | Yes.[1] |

[1] Denotes colloidal water solubility.

which is not obvious or significant in Part 2 and that is the size of the molecule. The reaction obviously must take place at the terminal hydroxyl. If one starts, for example, with hepta-polypentaerythritol having 16 hydroxyls and oxyethylates as described in Part 2, and then oxypropylates, it becomes obvious that there are present and susceptible to reaction 16 hydroxyl groups per molecule and no more. As the molecule grows larger the opportunity for reaction by random collision decreases. Ordinarily, this may not be a factor but I have noticed that as one passes the 20,000 molecular weight range, and particularly the range between 20,000 and 50,000, adding catalyst is much less effective than in the lower molecular weight range. In other words, the reaction cannot be speeded up necessarily to any great degree by increasing the amount of catalyst from ¾% to 1¼%. The reaction apparently is slow due to the size of the molecule. Needless to say, this view is in the nature of speculation and may be entirely wrong. Such delayed activity may reside with some other cause. However, from a practical standpoint no advantage has been found and derivatives much beyond a 50,000 molecular weight based on a sta- In the preparation of the above compounds practically without exception when the molecular weight reaches 35,000 or more the products give an excellent colloidal solution in water comparable, in fact, with an ordinary soap solution in many ways. For instance, such characteristic solubility is shown very clearly by compound Example 16b, which can be prepared entirely from commercially available chemical products, i. e., hepta-pentaerythritol, ethylene oxide and propylene oxide.

My preferred final products are those which show at least colloidal solubility as illustrated by Example 16b as far as synergistic or emulsion promoting properties are concerned. However, for demulsification I prefer lower molecular weights, in the range of approximately 20,000 to 25,000.

The products above described are viscous amber colored liquids which, in fact, are similar to those derived at the intermediate stage. The color varies from deep yellow or light amber to amber, dark amber, or reddish amber. The viscosity varies somewhat from that of castor oil to that of blown castor oil. The products can be bleached in the customary manner by use of charcoal, filter clays, or the like. If a solvent is used initially with a polypentaerythritol to give a slurry which is convenient to handle, such solvent can remain in the final product or be removed by vacuum distillation. However, my preference is, if desirable to remove the solvent, to do so at the end of the intermediate stage.

It is obvious that certain modifications can be made which do not depart from the spirit of the invention. The initial raw materials, i. e., the specified polypentaerythritols or modifications thereof which bear a simple genetic relationship to the polypentaerythritols, are water-insoluble and xylene-insoluble materials. Such initial reactants are treated in the manner described to yield materials which are water-dispersible or in which the water-solubility is at least completely differentiated from that of the original products. At this stage the intermediates are still xylene-insoluble. They are then converted into xylene-soluble materials. It is perfectly obvious that if one treats a material as described in the first table with ethylene oxide or glycide or a combination, that a small percentage of the oxide could be replaced by another oxide, as for example, propylene oxide. For instance, note that one of the initial materials, for instance, Example 9a, has a molecular weight of approximately 7200. In the introduction of approximately 144 moles of ethylene oxide a few of such moles of ethylene oxide could be replaced at an earlier intermediate stage with propylene oxide without particularly affecting the specified characteristics. Needless to say, such variation would not be departing from the spirit of the invention in the slightest.

Likewise, Example 9a is oxypropylated subsequently to give Examples 12b, 13b, 14b, etc. Example 14b has a molecular weight of about 25,000. It goes without saying that a mole or two of ethylene oxide, or a mole or two of glycide, could be used in course of such procedure without particularly affecting the characteristic properties of the product. Here, again, such minor variation does not represent departure from the spirit of the invention.

If one examines the previous tables it becomes evident that the original insoluble constituent, i. e., the polypentaerythritol, such as tri-pentaerythritol, may contribute as little as 1% or less, of the final product. For instance, in Example 1a tripentaerythritol was treated with ethylene oxide so as to increase the molecular weight from 372 to 1470.

In the series of experiments beginning with 1b through 5b, a product was obtained whose molecular weight was approximately 30,000. Obviously had this example, i. e., 5b, been taken one stage further the percentage contributed by the original tri-pentaerythritol would have been under 1%. The upper range is approximately 7%, i. e., the initial reactant contributes from a fraction of 1% up to 5%, 6% or 7% of the final end product.

It is also to be noted that the general range of preferred examples shows that the alkylene oxide added in the preparation of the intermediate is within the range roughly of 3 to 1 to 9 to 1, or in some instances 12 to 1. Likewise, the amount of propylene oxide added in proportion to the ethylene oxide or glycide, or both, varies from less than one up to 20 to 1, or 25 to 1.

Actually from a practical standpoint there is no reason why the water-solubility step and the oxypropylation step need be considered separately or conducted separately. The most desirable procedure is to use either dipentaerythritol or tripentaerythritol and for many reasons the latter is very desirable, plus ethylene oxide followed by oxypropylation. Ethylene oxide is, of course, cheaper than glycide and presents less of a hazard than in handling the glycide.

Example 35b

The reaction vessel employed was a stainless steel autoclave with the usual devices for heating, heat control, stirrer, inlet, outlet, etc., which as has been pointed out previously, are conventional in this type of apparatus. The particular autoclave used had a capacity of about 15 gallons or approximately 125 pounds. Into this autoclave there were charged 10.38 pounds of commercial tripentaerythritol, and 6.75 pounds of diethyleneglycol diethyl ether, plus 7.25 pounds of xylene and one pound of powdered caustic soda. The autoclave was sealed, swept with nitrogen gas, and heat applied so as to raise the temperature modestly above the boiling point of water, to wit, in the neighborhood of about 240° C. 13.25 pounds of ethylene oxide were added, about, roughly 1.3 times the weight of the initial tripentaerythritol. This oxyethylation was conducted at a temperature of 240° to 255° F., with the pressure regulator set for 25 pounds per square inch. Actually, in the entire series of oxyalkylations the pressure never got higher than 15 to 20 pounds and in the entire series the temperature was 245°–255° F., not too much above the boiling point of water. The 13 pounds of ethylene oxide were added in a little less than an hour. It was added continuously as quickly as absorbed and actually the reaction was complete in probably 30 or 40 minutes. Stirring continued, however, until the total elapsed time from the start was one hour. At the end of the oxyethylation, when the sample was withdrawn and heated to evaporate the xylene and then mixed with water it was readily soluble or miscible so as to give an aqueous solution or suspension which contained more than 1% of the oxyethylated derivative on a solvent-free basis, since there was still diethylene glycol diethylether present. In other procedures I have increased the amount of ethylene oxide at this stage, using up to twice the weight, for example, based on the original polypentaerythritol employed.

Actually, as soon as the oxyethylation was complete and the product checked in the manner noted, oxypropylation was continued practically as part of the same step. In this instance, 41.25 pounds of propylene oxide were added in about 5½ hours. The oxide was added at a little over 8 or 9 pounds per hour. At the end of this period the oxyalkylated mixture represented 10.38 pounds of tripentaerythritol, one pound of caustic soda, 6.7 pounds of diethyleneglycol diethylether, 7.25 pounds of xylene, 13.25 pounds of ethylene oxide, and 41.25 pounds of propylene oxide. Since the ratio of the two solvents stayed constant, to wit, 48.2% of diethyleneglycol diethylether and 51.8% xylene hereafter reference to solvent means this specific mixture. At the end of the oxypropylation step part of the reaction mass was withdrawn and the remainder subjected to oxypropylation under substantially the same temperature and pressure conditions, and in the same manner as described in the example immediately following.

Example 36b 49.13 pounds of the reaction mass previously identified as Example 35b and equivalent to 6.38 pounds of tripentaerythritol, 8.14 pounds of ethylene oxide, 25.38 pounds of propylene oxide, .61 pound of causic soda and 8.62 pounds of solvent, were subjected to further oxypropylation in the manner described in Example 35b, preceding. The amount of propylene oxide added was 19.25 pounds. The time required to add the propylene oxide was 4.25 hours. The oxide was added at the rate of about 5 pounds per hour. At the end of the oxypropylation part of the reaction mass was withdrawn and oxypropylation continued as described in the next example immediately following.

Example 37b 53.13 pounds of reaction mass identified as Example 36b and equivalent to 4.95 pounds of tripentaerythritol, 6.31 pounds of ethylene oxide, 34.70 pounds of propylene oxide, .47 pound of caustic soda, and 6.70 pounds of solvent, were subjected to further oxypropylation in the manner described in the two preceding examples. The amount of propylene oxide added was 24.5 pounds. The time required to add the oxide was 5 hours. The oxide was added at the rate of about 6 pounds per hour. When the reaction was complete part of the reaction mass was withdrawn and the remainder subjected to further oxypropylation as described in Example 38b, immediately following.

Example 38b 46.88 pounds of the reaction mass identified as Example 37b immediately preceding and equivalent to 2.99 pounds of tripentaerythritol, 3.81 pounds of ethylene oxide, 35.74 pounds of propylene oxide, .29 pound of caustic soda, and 4.05 pounds of solvent, were subjected to further reaction with 16 pounds of propylene oxide. The conditions of reaction were the same as in the three preceding examples. The time required to add the propylene oxide was 5 hours. It was added at the rate of about 4 pounds per hour. When the reacton was complete part of the reaction mass was withdrawn and the remainder subjected to further oxypropylation as described in Example 39b, following.

Example 39b 42.13 pounds of reaction mass identified as Example 38b preceding, and equivalent to 2.05 pounds of tripentaerythritol, 2.54 pounds of ethylene oxide, 34.60 pounds of propylene oxide, .9 pound of caustic soda, and 2.75 pounds of solvent were subjected to further oxypropylation with 14 pounds of propylene oxide. The conditions of reaction were the same as described in the four preceding examples. The time required to add the oxide was 5½ hours. The oxide was added at about the rate of 3 pounds per hour. When the reaction was complete part of the reaction mass was withdrawn and subjected to further oxypropylation as described in Example 40b, immediately following.

Example 40b 37.38 pounds of the reaction mass identified as Example 39b, immediately preceding, and equivalent to 1.36 pounds of tripentaerythritol, 1.69 pounds of ethylene oxide, 32.36 pounds of propylene oxide, .13 pound of caustic soda, and 1.84 pounds of solvent, were subjected to further oxypropylation with 13.75 pounds of propylene oxide. The time required to add this propylene oxide was 6 hours. The oxypropylation was conducted in the same manner as described in the five examples immediately preceding. The oxide was added at the rate of approximately 2 to 3 pounds per hour. At the end of the reaction period part of the reaction mass was withdrawn and the remainder subjected to a final oxypropylation step as described in Example 41b, following.

Example 41b 43.83 pounds of the reaction mass identified as Example 40b, preceding, and equivalent to 1.16 pounds of tripentaerythritol, 1.44 pounds of ethylene oxide, 39.55 pounds of propylene oxide, .11 pound of caustic soda and 1.57 pounds of solvent, were subjected to final oxypropylation in the same manner as described in the six examples preceding. The amount of oxide added was 11 pounds. The time required to add this oxide was 8 hours. It was added at the rate of about 1½ pounds per hour. It is to be noted that no catalyst was added in any of the examples after Example 35b, i. e., no further catalyst was added in Examples 36b through 41b, inclusive.

What has been said preceding is presented in tabular form in Table 1, following, with some added information as to molecular weight and as to solubility of the reaction product in water, xylene, and kerosene.

TABLE 1

| Ex. No. | Composition Before | | | | Theo. M. W. | Composition at End | | | | Hyd. Mol. Wt. | Max. Temp., °F. | Max. Pres., lbs. sq. in. | Time, hrs. |
|---|---|---|---|---|---|---|---|---|---|---|---|---|---|
| | H. C. Amt., lbs. | Oxide Amt., lbs. | Catalyst Amt., lbs. | Solvent,[1] Amt., lbs. | | H. C. Amt., lbs. | Oxide Amt., lbs. | Catalyst, lbs. | Solvent,[1] lbs. | | | | |
| 35b | 10.38 | | 1.0 | 14.00 | 2,325 | 10.38 | 13.25E / 41.25P | 1.0 | 14 | 2,208 | 245–255 | 15–20 | 1E / 5½P |
| 36b | 6.38 | 8.14E / 25.38P | .61 | 8.62 | 3,440 | 6.38 | 8.14E / 44.63P | .61 | 8.62 | 2,832 | 245–255 | 15–20 | 4¼ |
| 37b | 4.95 | 6.31E / 34.70P | .47 | 6.70 | 5,295 | 4.95 | 6.31E / 59.20P | .47 | 6.70 | 3,576 | 245–255 | 15–20 | 5 |
| 38b | 2.99 | 3.81E / 35.74P | .29 | 4.05 | 7,270 | 2.99 | 3.81E / 51.74P | .29 | 4.05 | 4,208 | 245–255 | 15–20 | 5 |
| 39b | 2.05 | 2.54E / 34.60P | .19 | 2.75 | 9,650 | 2.05 | 2.54E / 48.60P | .19 | 2.75 | 3,160 | 245–255 | 15–20 | 5½ |
| 40b | 1.36 | 1.69E / 32.36P | .13 | 1.84 | 13,470 | 1.36 | 1.69E / 46.11P | .13 | 1.84 | 5,296 | 245–255 | 15–20 | 6 |
| 41b | 1.16 | 1.44E / 39.35P | .11 | 1.57 | 16,970 | 1.16 | 1.44E / 50.35P | .11 | 1.57 | 4,360 | 245–255 | 15–20 | 8 |

[1] Solvent—diethyleneglycol diethylether=48.2%; xylene=51.8%.
E means ethylene oxide.
P means propylene oxide.

Example 35b was emulsifiable in water, and insoluble in both xylene and kerosene; Examples 36b through 39b were all insoluble in water, dispersible in xylene, and insoluble in kerosene; Example 40b was insoluble in water, soluble in xylene, and dispersible in kerosene; and Example 41b was insoluble in water but soluble in both xylene and kerosene.

The final products varied from a light straw color or pale amber, to somewhat viscous fluids of a reddish brown color in a few instances. This was more or less the characteristic of all the oxypropylated products at the various stages. These products were, of course, slightly alkaline due to the residual caustic soda. The residual basicity, due to the catalyst, of course, would be the same as if sodium methylate had been used.

Speaking of insolubility in water or solubility in kerosene such solubility test can be made simply by shaking small amounts of the materials in a test tube with water, for instance, using 1% to 5% approximately based on the amount of water present.

Needless to say, there is no complete conversion of propylene oxide into the desired hydroxylated compounds. This is indicated by the fact that the theoretical molecular weight based on a statistical average is greater than the molecular weight calculated by usual methods on basis of acetyl or hydroxyl value. Actually, there is no completely satisfactory method for determining molecular weights of these types of compounds with a high degree of accuracy when the molecular weights exceed 2,000. In some instances the acetyl value or hydroxyl value serves as satisfactorily as an index to the molecular weight as any other procedure, subject to the above limitations, and especially in the higher molecular weight range. If any difficulty is encountered in the manufacture of the esters as described in Part 4 the stoichiometrical amount of acid or acid compound should be taken which corresponds to the indicated acetyl or hydroxyl value. This matter has been discussed in the literature and is a matter of common knowledge and requires no further elaboration. In fact, it is illustrated by some of the examples appearing in the patent previously mentioned.

PART 4

As previously pointed out the present invention is concerned with acidic esters obtained from the oxypropylated derivatives described in Part 3, immediately preceding, and polycarboxy acids, particularly tricarboxy acids like citric and dicarboxy acids such as adipic acid, phthalic acid, or anhydride, succinic acid, diglycollic acid, sebacic acid, azelaic acid, aconitic acid, maleic acid or anhydride, citraconic acid or anhydride, maleic acid or anhydride adducts as obtained by the Diels-Alder reaction from products such as maleic anhydride, and cyclopentadiene. Such acids should be heat stable so they are not decomposed during esterification. They may contain as many as 36 carbon atoms as, for example, the acids obtained by dimerization of unsaturated fatty acids, unsaturated monocarboxy fatty acids, or unsaturated monocarboxy acids having 18 carbon atoms. Reference to the acid in the hereto appended claims obviously includes the anhydrides or any other obvious equivalents. My preference, however, is to use polycarboxy acids having not over 8 carbon atoms.

The production of esters including acid esters (fractional esters) from polycarboxy acids and glycols or other hydroxylated compounds is well known. Needless to say, various compounds may be used such as the low molal ester, the anhydride, the acyl chloride, etc. However, for purpose of economy it is customary to use either the acid or the anhydride. A conventional procedure is employed. On a laboratory scale one can employ a resin pot of the kind described in U. S. Patent No. 2,499,370, dated March 7, 1950 to DeGroote and Keiser, and particularly with one more opening to permit the use of a porous spreader if hydrochloric acid gas is to be used as a catalyst. Such device or absorption spreader consists of minute Alundum thimbles which are connected to a glass tube. One can add a sulfonic acid such as paratoluene sulfonic acid as a catalyst. There is some objection to this because in some instances there is some evidence that this acid catalyst tends to decompose or rearrange heat-oxypropylated compounds, and particularly likely to do so if the esterification temperature is too high. In the case of polycarboxy acids such as diglycollic acid, which is strongly acidic there is no need to add any catalyst. The use of hydrochloric acid gas has one advantage over paratoluene sulfonic acid and that is that at the end of the reaction it can be removed by flushing out with nitrogen, whereas there is no reasonably convenient means available of removing the paratoluene sulfonic acid or other sulfonic acid employed. If hydrochloric acid is employed one need only pass the gas through at an exceedingly slow rate so as to keep the reaction mass acidic. Only a trace of acid need be present. I have employed hydrochloric acid gas or the aqueous acid itself to eliminate the initial basic material. My preference, however, is to use no catalyst whatsoever.

The products obtained in Part 3 preceding may contain a basic catalyst. As a general procedure I have added an amount of half-concentrated hydrochloric acid considerably in excess of what is required to neutralize the residual catalyst. The mixture is shaken thoroughly and allowed to stand overnight. It is then filtered and refluxed with the xylene present until the water can be separated by a phase-separating trap. As soon as the product is substantially free from water the distillation stops. This preliminary step can be carried out in the flask to be used for esterification. If there is any further deposition of sodium chloride during the reflux stage needless to say a second filtration may be required. In any event the neutral or slightly acidic solution of the oxypropylated derivatives described in Part 3 is then diluted further with sufficient xylene, decalin, petroleum solvent, or the like, so that one has obtained approximately a 40% solution. To this solution there is added a polycarboxylated reactant as previously described, such as phthalic anhydride, succinic acid or anhydride, diglycollic acid, etc. The mixture is refluxed until esterification is complete as indicated by elimination of water or drop in carboxyl value. Needless to say, if one produces a half-ester from an anhydride such as phthalic anhydride, no water is eliminated. However, if it is obtained from diglycollic acid, for example, water is eliminated.

All such procedures were conventional and have been so thoroughly described in the literature that further consideration will be limited to a few examples and a comprehensive table.

Other procedures for eliminating the basic residual catalyst, if any, can be employed. For example, the oxyalkylation can be conducted in absence of a solvent or the solvent removed after oxypropylation. Such oxypropylation end product can then be acidified with just enough concentrated hydrochloric acid to just neutralize the residual basic catalyst. To this product one can then add a small amount of anhydrous sodium sulfate (sufficient in quantity to take up any water that is present) and then subject the mass to centrifugal force so as to eliminate the hydrated sodium sulfate and probably the sodium chloride formed. The clear somewhat viscous straw-colored or amber liquid so obtained may contain a small amount of sodium sulfate or sodium chloride but, in any event, is perfectly acceptable for esterification in the manner described.

It is to be pointed out that the products here described are not polyesters in the sense that there is a plurality of both polypentaerythritol radicals and acid radicals; the product is characterized by having only one polypentaerythritol radical.

By following slight modifications of what has been said previously one can conduct the esterification on a laboratory scale with greater convenience. Obviously, if one starts with a polyhydric compound having 3 or more hydrolyls and adds a dicarboxy acid there is at least some opportunity for cross-linking and formation of insoluble materials. However, insolubility of a gelation effect can arise in other ways, for instance, possible incipient cross-linking rather than intermediate or complete cross-linking, and also the fact that there are certain limitations as far as solubility goes in any large molecule, to say nothing of peculiarities of structure insofar that one of the original reactants, for instance, dipentaerythritol or tripentaerythritol, are much less soluble in water than one might ordinarily expect on the carbon-oxygen ratio. After the water is removed in the case of the esterification by means of a water-insoluble solvent, such as benzene, xylene or the use of some other comparable solvent or mixtures, one is confronted with the fact that the acidic ester is not necessarily soluble in such nonpolar solvent, and possibly because it either does cross-link or at least gives a pseudo gel. I have used the terminology "pseudo gel" for the reason that such gel is reversible as distinguished from a true non-reversible gel produced by cross-linking. The exact nature of this tendency to become insoluble or tendency toward gelation is obscure and not fully understood. In light of the effect of semi-polar solvents there may be some relationship, and in fact an important one to hydrogen bonding factors.

However, by the addition of a semi-polar solvent, such as diethyleneglycol diethylether, or some other similar solvent such as an alcohol, one tends to reduce or eliminate this effect. The alcohol, of course, must be added at the end of the reaction so as to not interfere with the esterification. The non-hydroxy semi-polar solvent can be added at the start of esterification provided it does not interfere with water removal. In any event, one can obtain a homogeneous system in which substantially the entire material is in solution.

Referring to the original oxypropylation it is to be noted that a solvent, such as xylene, is present for a matter of convenience such as giving an incipient slurry. Also, it is to be noted that the intermediates are xylene-soluble especially in the latter stages. Therefore, even if one were to use benzene alone or cymene alone, there still would be present the xylene which had been used in the oxypropylation step.

Referring now to a number of examples, for instance, Examples 1c through 42c, with the exception of 5c, 11c, 35c and 40c; in these particular instances, as explained subsequently, a small amount of methanol was used after esterification was complete to give a more satisfactory solution. The xylene indicated is not added xylene but refers to xylene used along with diethyleneglycol diethylether in the original oxypropylation step. Subsequently, however, more diethyleneglycol diethylether was added. In each instance the amount of benzene added was 50 grams. Then sufficient "diethyl carbitol" was added to give the indicated amount of solution except in a few instances when methanol was added as previously referred to and as will be explained later. "Diethyl carbitol" is the trade name for diethyleneglycol diethylether. Actually, the amount of this latter solvent used was judged purely as a matter of convenience in the glassware employed and when the reaction was complete the reaction mass was withdrawn and this weight used to calculate the actual total solvent. In each instance an effort was made to obtain approximately a 50% solution. The selection of 50% solvent was just arbitrary for the reason that when these compounds were tested for demulsification it was convenient to have a 50% solution. It goes without saying that a 25% solution would serve also. In practically every instance after a homogeneous solution was obtained one could subject it to distillation, particularly vacuum distillation, remove a small amount of benzene and still have a homogeneous solution having exactly 50% if desired. In this modification one could, of course, use decalin, cymene, or some other ether such as the diethyl ether of ethyleneglycol, or a comparable ether instead of the particular one use.

In Examples 5c, 11c, 35c and 40c previously referred to there is a tendency for solids to separate out. In these experiments there was some solid material at the end of the procedure which was apparently soluble in methanol. Therefore, a small amount of methanol, approximately 10 to 30 grams, was added which resulted in more complete solubility. In any event in some instances the final solution contained less than 50% active material, i. e., more than 50% solvent, and this is noted. All these variations are of incidental value as a convenience but not an inherent part of the invention. This is obvious from the hereto attached claims.

The data included in the subsequent tables, i. e., Tables 2 and 3, are self-explanatory and very complete, and it is believed no further elaboration is necessary.

TABLE 2

| Ex. No. of Acid Ester | Ex. No. of Oxy. Cmpd. | Theo. M.W. of H.C. | Theo. Hydroxyl V. of H.C. | Actual Hydroxyl Value | Mol. Wt. Based on Actual H.V. | Amt. of Hyd. Cmpd. (grs.) | Polycarboxy Reactant | Amt. of Polycarboxy Reactant (grs.) |
|---|---|---|---|---|---|---|---|---|
| 1c | 35b | 2,325 | 193 | 203 | 2,208 | 88.3 | Diglycolic Acid | 42.9 |
| 2c | 35b | 2,325 | 193 | 203 | 2,208 | 88.3 | Oxalic Acid | 40.3 |
| 3c | 35b | 2,325 | 193 | 203 | 2,208 | 88.3 | Aconitic Acid | 55.7 |
| 4c | 35b | 2,325 | 193 | 203 | 2,208 | 88.3 | Adipic Acid | 46.7 |
| 5c | 35b | 2,325 | 193 | 203 | 2,208 | 88.3 | Phthalic Anhyd | 47.4 |
| 6c | 35b | 2,325 | 193 | 203 | 2,208 | 88.3 | Maleic Anhyd | 31.4 |
| 7c | 36b | 3,440 | 130.5 | 159 | 2,832 | 113.2 | Diglycolic Acid | 42.9 |
| 8c | 36b | 3,440 | 130.5 | 159 | 2,832 | 113.2 | Oxalic Acid | 40.3 |
| 9c | 36b | 3,440 | 130.5 | 159 | 2,832 | 113.2 | Aconitic Acid | 55.7 |
| 10c | 36b | 3,440 | 130.5 | 159 | 2,832 | 113.2 | Adipic Acid | 46.7 |
| 11c | 36b | 3,440 | 130.5 | 159 | 2,832 | 113.2 | Phthalic Anhyd | 47.4 |
| 12c | 36b | 3,440 | 130.5 | 159 | 2,832 | 113.2 | Maleic Anhyd | 31.4 |
| 13c | 37b | 5,295 | 85 | 125.5 | 3,576 | 112 | Diglycolic Acid | 34.3 |
| 14c | 37b | 5,295 | 85 | 125.5 | 3,576 | 112 | Oxalic Acid | 32.3 |
| 15c | 37b | 5,295 | 85 | 125.5 | 3,576 | 112 | Aconitic Acid | 44.5 |
| 16c | 37b | 5,295 | 85 | 125.5 | 3,576 | 112 | Adipic Acid | 37.4 |
| 17c | 37b | 5,295 | 85 | 125.5 | 3,576 | 112 | Phthalic Anhyd | 36.7 |
| 18c | 37b | 5,295 | 85 | 125.5 | 3,576 | 112 | Maleic Anhyd | 24.4 |
| 19c | 38b | 7,240 | 62 | 106.5 | 4,208 | 129 | Diglycolic Acid | 32.2 |
| 20c | 38b | 7,240 | 62 | 106.5 | 4,208 | 129 | Oxalic Acid | 30.2 |
| 21c | 38b | 7,240 | 62 | 106.5 | 4,208 | 129 | Aconitic Acid | 41.8 |
| 22c | 38b | 7,240 | 62 | 106.5 | 4,208 | 129 | Adipic Acid | 35.1 |
| 23c | 38b | 7,240 | 62 | 106.5 | 4,208 | 129 | Phthalic Anhyd | 35.6 |
| 24c | 38b | 7,240 | 62 | 106.5 | 4,208 | 129 | Maleic Anhyd | 23.5 |
| 25c | 39b | 9,650 | 46.5 | 142 | 3,160 | 93 | Diglycolic Acid | 31.5 |
| 26c | 39b | 9,650 | 46.5 | 142 | 3,160 | 92 | Oxalic Acid | 29.2 |
| 27c | 39b | 9,650 | 46.5 | 142 | 3,160 | 92 | Aconitic Acid | 40.4 |
| 28c | 39b | 9,650 | 46.5 | 142 | 3,160 | 93.2 | Adipic Acid | 34.4 |
| 29c | 39b | 9,650 | 46.5 | 142 | 3,160 | 93.2 | Phthalic Anhyd | 34.8 |
| 30c | 39b | 9,650 | 46.5 | 142 | 3,160 | 93 | Maleic Anhyd | 23.0 |
| 31c | 40b | 13,470 | 33.4 | 85.0 | 5,296 | 108.5 | Diglycolic Acid | 23.6 |
| 32c | 40b | 13,470 | 33.4 | 85.0 | 5,296 | 108.5 | Oxalic Acid | 22.2 |
| 33c | 40b | 13,470 | 33.4 | 85.0 | 5,296 | 108.5 | Aconitic Acid | 30.6 |
| 34c | 40b | 13,470 | 33.4 | 85.0 | 5,296 | 108.5 | Adipic Acid | 28.7 |
| 35c | 40b | 13,470 | 33.4 | 85.0 | 5,296 | 108.5 | Phthalic Anhyd | 26.0 |
| 36c | 40b | 13,470 | 33.4 | 85.0 | 5,296 | 108.5 | Maleic Anhyd | 17.2 |
| 37c | 41b | 16,970 | 26.5 | 103 | 4,360 | 87.8 | Diglycolic Acid | 21.4 |
| 38c | 41b | 16,970 | 26.5 | 103 | 4,360 | 87.8 | Oxalic Acid | 20.0 |
| 39c | 41b | 16,970 | 26.5 | 103 | 4,360 | 87.8 | Aconitic Acid | 27.8 |
| 40c | 41b | 16,970 | 26.5 | 103 | 4,360 | 87.8 | Adipic Acid | 23.4 |
| 41c | 41b | 16,970 | 26.5 | 103 | 4,360 | 87.8 | Phthalic Anhyd | 23.7 |
| 42c | 41b | 16,970 | 26.5 | 103 | 4,360 | 87.8 | Maleic Anhyd | 15.7 |

TABLE 3

| Ex. No. of Acid Ester | Solvent | Amt. Solvent (grs.) | Max. Esterification Temp., °C. | Time of Esterification (hrs.) | Water Out (cc.) | Percent Solvent |
|---|---|---|---|---|---|---|
| 1c | Benzene, Xylene, Diethylcarbitol | 125.3 | 146 | 1 | 5.9 | 50 |
| 2c | do | 122.1 | 145 | 2¼ | 18.6 | 52 |
| 3c | do | 138.0 | 150 | 1¾ | 6.0 | 50 |
| 4c | do | 129.2 | 145 | 1¾ | 5.8 | 50 |
| 5c | Benzene, Xylene, Diethylcarbitol, methanol | 134.3 | 158 | 3 | 1.4 | 50 |
| 6c | Benzene, Xylene, Diethylcarbitol | 125.9 | 155 | 2 | 2.0 | 52 |
| 7c | do | 150 | 145 | ¾ | 6.0 | 50 |
| 8c | do | 136 | 135 | 2 | 17.6 | 50 |
| 9c | do | 166 | 160 | 1 | 6.0 | 50 |
| 10c | do | 154 | 155 | 1 | 6.0 | 50 |
| 11c | Benzene, Xylene, Diethylcarbitol, Methanol | 160 | 155 | 1¾ | 0.8 | 50 |
| 12c | Benzene, Xylene, Diethylcarbitol | 144 | 145 | 1¾ | 0.6 | 50 |
| 13c | do | 162.9 | 160 | 2 | 4.6 | 54 |
| 14c | do | 150 | 140 | 2 | 14.2 | 53 |
| 15c | do | 171.5 | 150 | 2 | 7.0 | 53 |
| 16c | do | 164.6 | 150 | 2 | 8.2 | 53 |
| 17c | do | 166.1 | 160 | 3 | 2.0 | 53 |
| 18c | do | 153.2 | 160 | 3 | 1.0 | 53 |
| 19c | do | 158.6 | 180 | 2½ | 2.6 | 50 |
| 20c | do | 146.0 | 165 | 2½ | 12.9 | 50 |
| 21c | do | 166.6 | 180 | 1¾ | 4.2 | 50 |
| 22c | do | 160.5 | 180 | 11½ | 3.8 | 50 |
| 23c | do | 164.0 | 164 | 1¾ | ------ | 50 |
| 24c | do | 152.5 | 160 | 1¾ | ------ | 50 |
| 25c | do | 121.5 | 160 | 2 | 3.0 | 50 |
| 26c | do | 109.4 | 150 | 2½ | 11.8 | 50 |
| 27c | do | 127.4 | 150 | 2½ | 5.0 | 50 |
| 28c | do | 123.5 | 155 | 2¾ | 4.0 | 50 |
| 29c | do | | 185 | 3 | 1.0 | (¹) |
| 30c | do | 115.0 | 165 | 3 | 0.8 | 50 |
| 31c | do | 128.9 | 175 | 2¼ | 3.2 | 50 |
| 32c | do | 121.1 | 150 | 2¼ | 9.6 | 50 |
| 33c | do | 135.7 | 160 | 2¼ | 3.4 | 50 |
| 34c | do | 131.2 | 190 | 11 | 3.0 | 50 |
| 35c | Benzene, Xylene, Diethylcarbitol, methanol | 134.5 | 175 | 11 | ------ | 50 |
| 36c | Benzene, Xylene, Diethylcarbitol | 125.7 | 160 | 3¼ | ------ | 50 |
| 37c | do | 106 | 190 | 3 | 3.0 | 50 |
| 38c | do | 99 | 150 | 3 | 9.0 | 50 |
| 39c | do | 112.6 | 180 | 8 | 3.0 | 50 |
| 40c | Benzene, Xylene, Diethylcarbitol, methanol | 109 | 200 | 8¾ | 2.2 | 50 |
| 41c | Benzene, Xylene, Diethylcarbitol | 111.8 | 160 | 8¾ | ------ | 50 |
| 42c | do | 103.5 | 185 | 2 | ------ | 50 |

¹ Decompose—discarded.

The procedure for manufacturing the esters has been illustrated by preceding examples. If for any reason reaction does not take place in a manner that is acceptable, attention should be directed to the following details: (a) Recheck the hydroxyl or acetyl value of the oxypropylated hydroxy compounds of the kind specified and use a stoichiometrically equivalent amount of acid; (b) if the reaction does not proceed with reasonable speed either raise the temperature indicated or else extend the period of time up to 12 or 16 hours if need be; (c) if necessary, use ½% of paratoluene sulfonic acid or some other acid as a catalyst; (d) if the esterification does not produce a clear product a check should be made to see if an inorganic salt such as sodium chloride or sodium sulfate is not precipitating out. Such salt should be eliminated, at least for exploration experimentation, and can be removed by filtering. Everything else being equal as the size of the molecule increases and the reactive hydroxyl radical represents a smaller fraction of the entire molecule more difficulty is involved in obtaining complete esterification.

Even under the most carefully controlled conditions of oxypropylation involving comparatively low temperatures and long time of reaction there are formed certain compounds whose compositions is still obscure. Such side reaction products can contribute a substantial proportion of the final cogeneric reaction mixture. Various suggestions have been made as to the nature of these compounds, such as being cyclic polymers of propylene oxide, dehydration products with the appearance of a vinyl radical, or isomers of propylene oxide or derivatives thereof, i. e., of an aldehyde, ketone, or allyl alcohol. In some instances an attempt to react the stoichiometric amount of a polycarboxy acid with the oxypropylated derivative results in an excess of the carboxylated reactant for the reason that apparently under conditions of reaction less reactive hydroxyl radicals are present than indicated by the hydroxyl value. Under such circumstances there is simply a residue of the carboxylic reactant which can be removed by filtration or, if desired, the esterification procedure can be repeated using an appropriately reduced ratio of carboxylic reactant.

Even the determination of the hydroxyl value and conventional procedure leaves much to be desired due either to the cogeneric materials previously referred to, or for that matter, the presence of any inorganic salts or propylene oxide. Obviously this oxide should be eliminated.

The solvent employed, if any, can be removed from the finished ester by distillation and particularly vacuum distillation. The final products or liquids are generally from pale amber to a very pale straw color, and some have a distinct reddish-brown color and show moderate viscosity, or sometimes increased viscosity in light of what has been said previously in regard to cross-linking, gelation, etc. Unless there is some reason to do otherwise my preference is to handle these esters as 50% solutions in suitable solvents. They can be bleached with bleaching clays, filtering chars, and the like. However, for the purpose of demulsification or the like color is not a factor and decolorization is not justified.

PART 5

Conventional demulsifying agents employed in the treatment of oil field emulsions are used as such, or after dilution with any suitable solvent, such as water, petroleum hydrocarbons, such as benzene, toluene, xylene, tar acid oil, cresol, anthracene oil, etc. Alcohols, particularly aliphatic alcohols, such as methyl alcohol, ethyl alcohol, denatured alcohol, propyl alcohol, butyl alcohol, hexyl alcohol, octyl alcohol, etc., may be employed as diluents. Miscellaneous solvents such as pine oil, carbon tetrachloride, sulfur dioxide extract obtained in the refining of petroleum, etc., may be employed as diluents. Similarly, the material or materials employed as the demulsifying agent of my process may be admixed with one or more of the solvents customarily used in connection with conventional demulsifying agents. Moreover, said material or materials may be used alone or in admixture with other suitable well-known classes of demulsifying agents.

It is well known that conventional demulsifying agents may be used in a water-soluble form, or in an oil-soluble form, or in a form exhibiting both oil- and water-solubility. Sometimes they may be used in a form which exhibits relatively limited oil-solubility. However, since such reagents are frequently used in a ratio of 1 to 10,000 or 1 to 20,000, or 1 to 30,000, or even 1 to 40,000, or 1 to 50,000 as in desalting practice, such an apparent insolubility in oil and water is not significant because said reagents undoubtedly have solubility within such concentrations. This same fact is true in regard to the material or materials employed as the demulsifying agent of my process.

In practicing my process for resolving petroleum emulsions of the water-in-oil type, a treating agent or demulsifying agent of the kind above described is brought into contact with or caused to act upon the emulsion to be treated, in any of the various apparatus now generally used to resolve or break petroleum emulsions with a chemical reagent, the above procedure being used alone or in combination with other demulsifying procedure, such as the electrical dehydration process.

One type of procedure is to accumulate a volume of emulsified oil in a tank and conduct a batch treatment type of demulsification procedure to recover clean oil. In this procedure the emulsion is admixed with the demulsifier, for example by agitating the tank of emulsion and slowly dripping demulsifier into the emulsion. In some cases mixing is achieved by heating the emulsion while dripping in the demulsifier, depending upon the convection currents in the emulsion to produce satisfactory admixture. In a third modification of this type of treatment, a circulating pump withdraws emulsion from, e. g., the bottom of the tank, and reintroduces it into the top of the tank, the demulsifier being added, for example, at the suction side of said circulating pump.

In a second type of treating procedure, the demulsifier is introduced into the well fluids at the well-head or at some point between the wellhead and the final oil storage tank, by means of an adjustable proportioning mechanism or proportioning pump. Ordinarily the flow of fluids through the subsequent lines and fittings suffices to produce the desired degree of mixing of demulsifier and emulsion, although in some instances additional mixing devices may be introduced into the flow system. In this general procedure, the system may include various mechanical devices for withdrawing free water, separating entrained water, or accomplishing quiescent settling of the chemicalized emulsion. Heating devices may likewise be incorporated in any of the treating procedures described herein.

A third type of application (down-the-hole) of demulsifier to emulsion is to introduce the demulsifier either periodically or continuously in diluted or undiluted form into the well and to allow it to come to the surface with the well fluids, and then to flow the chemicalized emulsion through any desirable surface equipment, such as employed in the other treating procedures. This particular type of application is decidedly useful when the demulsifier is used in connection with acidification of calcareous oil-bearing strata, especially if suspended in or dissolved in the acid employed for acidification.

In all cases, it will be apparent from the foregoing description, the broad process consists simply in introducing a relatively small proportion of demulsifier into a relatively large proportion of emulsion, admixing the chemical and emulsion either through natural flow or through special apparatus, with or without the application of heat, and allowing the mixture to stand quiescent until the undesirable water content of the emulsion separates and settles from the mass.

The following is a typical installation.

A reservoir to hold the demulsifier of the kind described (diluted or undiluted) is placed at the well-head where the effluent liquids leave the well. This reservoir or container, which may vary from 5 gallons to 50 gallons for convenience, is connected to a proportioning pump which injects the demulsifier drop-wise into the fluids leaving the well. Such chemicalized fluids pass through the flowline into a settling tank. The settling tank consists of a tank of any convenient size, for instance, one which will hold amounts of fluid produced in 4 to 24 hours (500 barrels to 2000 barrels capacity), and in which there is a perpendicular conduit from the top of the tank to almost the very bottom so as to permit the incoming fluids to pass from the top of the settling tank to the bottom, so that such incoming fluids do not disturb stratification which takes place during the course of demulsification. The settling tank has two outlets, one being below the water level to drain off the water resulting from demulsification or accompanying the emulsion as free water, the other being an oil outlet at the top to permit the passage of dehydrated oil to a second tank, being a storage tank, which holds pipeline or dehydrated oil. If desired, the conduit or pipe which serves to carry the fluid from the well to the settling tank may include a section of pipe with baffles to serve as a mixer, to insure thorough distribution of the demulsifier throughout the fluids, or a heater for raising the temperature of the fluids to some convenient temperature, for instance, 120° to 160° F., or both heater and mixer.

Demulsification procedure is started by simply setting the pump so as to feed a comparatively large ratio of demulsifier, for instance, 1:5,000. As soon as a complete "break" or satisfactory demulsification is obtained, the pump is regulated until experience shows that the amount of demulsifier being added is just sufficient to produce clean or dehydrated oil. The amount being fed at such stage is usually 1:10,000, 1:15,000, 1:20,000, or the like.

In many instances the oxyalkylated products herein specified as demulsifiers can be conveniently used without dilution. However, as previously noted, they may be diluted as desired with any suitable solvent. For instance, by mixing 75 parts by weight of the product of Example 13c with 15 parts by weight of xylene and 10 parts by weight of isopropyl alcohol, an excellent demulsifier is obtained. Selection of the solvent will vary, depending upon the solubility characteristics of the oxyalkylated product, and of course will be dictated in part by economic considerations, i. e., cost.

As noted above, the products herein described may be used not only in diluted form, but also may be used admixed with some other chemical demulsifier. A mixture which illustrates such combination is the following:

Oxyalkylated derivative, for example, the product of Example 13c, 20%;
A cyclohexylamine salt of a polypropylated naphthalene monosulfonic acid, 24%;
An ammonium salt of a polypropylated naphthalene monosulfonic acid, 24%;
A sodium salt of oil-soluble mahogany petroleum sulfonic acid, 12%;
A high-boiling aromatic petroleum solvent, 15%;
Isopropyl alcohol, 5%.

The above proportions are all weight percents.

PART 6

As pointed out previously the final product obtained is a fractional ester having free carboxyl radicals. Such product can be used as an intermediate for conversion into other derivatives which are effective for various purposes, such as the breaking of petroleum emulsions of the kind herein described. For instance, such product can be neutralized with an amine so as to increase its water-solubility such as triethanolamine, tripropanolamine, oxyethylated triethanolamine, etc. Similarly, such product can be neutralized with some amine which tends to reduce the water-solubility such as cyclohexylamine, benzylamine, decylamine, tetradecylamine, octadecylamine, etc. Furthermore, the residual carboxyl radicals can be esterified with alcohols, such as low molal alcohols, methyl, ethyl, propyl, butyl, etc., and also high molal alcohols, such as octyl, decyl, cyclohexanol, benzyl alcohol, octadecyl alcohol, etc. Such products are also valuable for a variety for purposes due to their modified solubility. This is particularly true where surface-active materials are of value and especially in demulsification of water-in-oil emulsion.

Having thus described my invention, what I claim as new and desire to secure by Letters Patent, is:

1. A process for breaking petroleum emulsions of the water-in-oil type characterized by subjecting the emulsion to the action of a demulsifier including fractional esters; said fractional esters being obtained by reaction between (A) a polycarboxy acid, and (B) high molal oxypropylation derivatives of oxyalkylated intermediates; and said oxyalkylated intermediates being derived in turn from polypentaerythritols, with the proviso that (a) the initial polyhydric reactant be free from any radical having at least 8 uninterrupted carbon atoms; (b) the intermediate have a molecular weight in excess of 1200 and less than 25,000; (c) the intermediate product be obtained by an oxyalkylation step involving a member of the class consisting of ethylene oxide and glycide; (d) the intermediate product be water-dispersible, at least to the extent of colloidal solubility, and be xylene-insoluble; (e) the solubility characteristics of the intermediates in respect to water be substantially the result of the oxyalkylation step employing a member of the class consisting of ethylene oxide and glycide; (f) the oxypropylation end-product be within the molecular weight range of 5,000 to 100,000 on an average statistical basis; (g) the oxypropylation end-product be at least xylene dispersible; (h) the xylene dispersibility characteristics of the oxypropylation end-product be substantially the result of the oxypropylation step; (i) the initial polyhydric reactant represent not more than 7% by weight of the oxypropylation end-product on a statistical basis, and that (j) the preceding provisos be based on complete reaction involving the alkylene oxides and the initial polyhydric reactant; and with the proviso that the ratio of (A) to (B) be one mole of the polycarboxy acid for each available hydroxyl radical.

2. A process for breaking petroleum emulsions of the water-in-oil type characterized by subjecting the emulsion to the action of a demulsifier including fractional esters; said fractional esters being obtained by reaction between (A) a polycarboxy acid, and (B) high molal oxypropylation derivatives of oxyalkylated intermediates; and said oxyalkylated intermediates being derived in turn from polypentaerythritols, with the proviso that (a) the initial polyhydric reactant be free from any radical having at least 8 uninterrupted carbon atoms; (b) the intermediate have a molecular weight in excess of 1200 and less than 25,000; (c) the intermediate product be obtained by an oxyalkylation step involving a member of the class consisting of ethylene oxide and glycide; (d) the intermediate product be water-dispersible, at least to the extent of colloidal solubility, and be xylene-insoluble; (e) the solubility characteristics of the intermediates in respect to water be substantially the result of the oxylation step employing a member of the class consisting of ethylene oxide and glycide; (f) the oxypropylation end-product be within the molecular weight range of 5,000 to 100,000 on an average statistical basis; (g) the oxypropylation end-product be at least xylene-dispersible; (h) the xylene dispersibility characteristics of the oxypropylation end-product be substantially the result of the oxypropylation step; (i) the oxypropylation end-product be substantially water-insoluble; (j) the initial polyhydric reactant represent not more than 7% by weight of the oxypropylation end-product on a statistical basis; and that (k) the preceding provisos be based on complete reaction involving the alkylene oxides and the initial polyhydric reactant; and with the proviso that the ratio of (A) to (B) be one mole of the polycarboxy acid for each available hydroxyl radical.

3. A process for breaking petroleum emulsions of the water-in-oil type characterized by subjecting the emulsion to the action of a demulsifier including fractional esters; said fractional esters being obtained by reaction between (A) a polycarboxy acid, and (B) high molal oxypropylation derivatives of oxyalkylated intermediates; and said oxyalkylated intermediates being derived in turn from polypentaerythritols, with the proviso that (a) the initial polyhydric reactant be free from any radical having at least 8 uninterrupted carbon atoms; (b) the intermediate have a molecular weight in excess of 1200 and less than 25,000; (c) the intermediate product be obtained by an oxyalkylation step involving a member of the class consisting of ethylene oxide and glycide; (d) the intermediate product be water-dispersible, at least to the extent of colloidal solubility, and be xylene-insoluble; (e) the solubility characteristics of the intermediates in respect to water be substantially the result of the oxyalkylation step employing a member of the class consisting of ethylene oxide and glycide; (f) the oxypropylation end-product be within the molecular weight range of 5,000 to 100,000 on an average statistical basis; (g) the oxypropylation end-product be at least xylene-dispersible; (h) the xylene dispersibility characteristics of the oxypropylation end-product be substantially the result of the oxypropylation step; (i) the oxypropylation end-product be substantially water-insoluble; (j) the initial polyhydric reactant represent not more than 7% by weight of the oxypropylation end-product on a statistical basis; and that (k) the preceding provisos be based on complete reaction involving the alkylene oxides and the initial polyhydric reactant; and with the proviso that the ratio of (A) to (B) be one mole of the polycarboxy acid for each available hydroxyl radical, and with the further proviso that the initial polypentaerythritol have at least 2 and not more than 3 pentaerythritol radicals.

4. A process for breaking petroleum emulsions of the water-in-oil type characterized by subjecting the emulsion to the action of a demulsifier including fractional esters; said fractional esters being obtained by reaction between (A) a polycarboxy acid, and (B) high molal oxypropylation derivatives of oxyalkylated intermediates; and said oxyalkylated intermediates being derived in turn from polypentaerythritols, with the proviso that (a) the initial polyhydric reactant be free from any radical having at least 8 uninterrupted carbon atoms; (b) the intermediate have a molecular weight in excess of 1200 and less than 25,000; (c) the intermediate product be obtained by an oxyethylation step; (d) the intermediate product be water-dispersible, at least to the extent of colloidal solubility, and be xylene-insoluble; (e) the solubility characteristics of the intermediates in respect to water be substantially the result of the oxyethylation step; (f) the oxypropylation end-product be within the molecular weight range of 5,000 to 100,000 on an average statistical basis; (g) the oxypropylation end-product be at least xylene-dispersible; (h) the xylene dispersibility characteristics of the oxypropylation end-product be substantially the result of the oxypropylation step; (i) the oxypropylation end-product be substantially water-insoluble; (j) the initial polyhydric reactant represent not more than 7% by weight of the oxypropylation end-product on a statistical basis; and that (k) the preceding provisos be based on complete reaction involving the alkylene oxides and the initial polyhydric reactant; and with the proviso that the ratio of (A) to (B) be one mole of the polycarboxy acid for each available hydroxyl radical, and with the further proviso that the initial polypentaerythritol have at least 2 and not more than 3 pentaerythritol radicals.

5. A process for breaking petroleum emulsions of the water-in-oil type characterized by subjecting the emulsion to the action of a demulsifier including fractional esters; said fractional esters being obtained by reaction between (A) a polycarboxy acid and (B) high molal oxypropylation derivatives of oxyalkylated intermediates; and said oxyalkylated intermediates being derived in turn from polypentaerythritols, with the proviso that (a) the initial polyhydric reactant be free from any radical having at least 8 uninterrupted carbon atoms; (b) the intermediate have a molecular weight in excess of 1200 and less than 25,000; (c) the intermediate product be obtained by an oxyethylation step; (d) the intermediate product be water-dispersible, at least to the extent of colloidal solubility, and be xylene-insoluble; (e) the solubility characteristics of the intermediates in respect to water be substantially the result of the oxyethylation step; (f) the oxypropylation end-product be within the molecular weight range of 5,000 to 100,000 on an average statistical basis; (g) the oxypropylation end-product be at least xylene-dispersible; (h) the xylene dispersibility characteristics of the oxypropylation end-product be substantially the result of the oxypropylation step; (i) the oxypropylation end-product be substantially water-insoluble; (j) the initial polyhydric reactant represent not more than 7% by weight of the oxypropylation end-product on a statistical basis; and that (k) the preceding provisos be based on complete reaction involving the alkylene oxides and the initial polyhydric reactant; and with the proviso that the ratio of (A) to (B) be one mole of the polycarboxy acid for each available hydroxyl radical, and with the further proviso that the initial polypentaerythritol have at least 2 and not more than 3 pentaerythritol radicals; and with the final proviso that the polycarboxy acid have not more than 8 carbon atoms.

6. A process for breaking petroleum emulsions of the water-in-oil type characterized by subjecting the emulsion to the action of a demulsifier including fractional esters; said fractional esters being obtained by reaction between (A) a dicarboxy acid and (B) high molal oxypropylation derivatives of oxyalkylated intermediates; and said oxyalkylated intermediates being derived in turn from polypentaerythritols, with the proviso that (a) the initial polyhydric reactant be free from any radical having at least 8 uninterrupted carbon atoms; (b) the intermediate have a molecular weight in excess of 1200 and less than 25,000; (c) the intermediate product be obtained by an oxyethylation step; (d) the intermediate product be water-dispersible, at least to the extent of colloidal solubility, and be xylene-insoluble; (e) the solubility characteristics of the intermediates in respect to water be substantially the result of the oxyethylation step; (f) the oxypropylation end-product be within the molecular weight range of 5,000 to 100,000 on an average statistical basis; (g) the oxypropylation end-product be at least xylene-dispersible; (h) the xylene dispersibility characteristics of the oxypropylation end-product be substantially the result of the oxypropylation step; (i) the oxypropylation end-product be substantially water-insoluble; (j) the initial polyhydric reactant represent not more than 7% by weight of the oxypropylation end-product on a statistical basis; and that (k) the preceding provisos be based on complete reaction involving the alkylene oxides and the initial polyhydric reactant; and with the proviso that the ratio of (A) to (B) be one mole of the dicarboxy acid for each available hydroxyl radical; and with the further proviso that the initial polypentaerythritol have at least 2 and not more than 3 pentaerythritol radicals, and with the final proviso that the dicarboxy acid have not more than 8 carbon atoms.

7. The process of claim 6 wherein the dicarboxy acid is phthalic acid.

8. The process of claim 6 wherein the dicarboxy acid is maleic acid.

9. The process of claim 6 wherein the dicarboxy acid is succinic acid.

10. The process of claim 6 wherein the dicarboxy acid is citraconic acid.

11. The process of claim 6 wherein the dicarboxy acid is diglycollic acid.

his
MELVIN × DE GROOTE.
mark

Witnesses to mark:
W. C. ADAMS,
I. S. DE GROOTE.

REFERENCES CITED

The following references are of record in the file of this patent:

UNITED STATES PATENTS

| Number | Name | Date |
|---|---|---|
| 2,344,980 | De Groote et al. | Mar. 28, 1944 |
| 2,454,808 | Kirkpatrick et al. | Nov. 30, 1948 |
| 2,552,528 | De Groote | May 15, 1951 |
| 2,552,529 | De Groote | May 15, 1951 |
| 2,552,532 | De Groote | May 15, 1951 |
| 2,552,533 | De Groote | May 15, 1951 |
| 2,554,667 | De Groote | May 29, 1951 |
| 2,562,878 | Blair | Aug. 7, 1951 |